United States Patent
Wang et al.

(10) Patent No.: US 12,381,269 B2
(45) Date of Patent: Aug. 5, 2025

(54) BATTERY PACK BOX AND BATTERY PACK

(71) Applicant: CONTEMPORARY AMPEREX TECHNOLOGY (HONG KONG) LIMITED, Hong Kong (CN)

(72) Inventors: Zhichao Wang, Ningde (CN); Linggang Zhou, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 761 days.

(21) Appl. No.: 17/386,834

(22) Filed: Jul. 28, 2021

(65) Prior Publication Data

US 2021/0391618 A1 Dec. 16, 2021

Related U.S. Application Data

(63) Continuation of application No. PCT/CN2019/075364, filed on Feb. 18, 2019.

(30) Foreign Application Priority Data

Jan. 30, 2019 (CN) .......................... 201920171822.4

(51) Int. Cl.
*H01M 10/613* (2014.01)
*H01M 10/615* (2014.01)
(Continued)

(52) U.S. Cl.
CPC ....... *H01M 10/613* (2015.04); *H01M 10/615* (2015.04); *H01M 10/625* (2015.04);
(Continued)

(58) Field of Classification Search
CPC ............ H01M 10/613; H01M 10/615; H01M 10/625; H01M 50/249; H01M 50/204; H01M 2220/20
See application file for complete search history.

(56) References Cited

FOREIGN PATENT DOCUMENTS

| CN | 107579181 A | * | 1/2018 |
| CN | 206849897 U | * | 1/2018 |

(Continued)

OTHER PUBLICATIONS

Machine English Translation for CN 107579181 (Year: 2018).*
(Continued)

*Primary Examiner* — Matthew T Martin
*Assistant Examiner* — Katherine N Higgins
(74) *Attorney, Agent, or Firm* — Scully, Scott, Murphy & Presser, P.C.

(57) ABSTRACT

The present application is provided with a battery box and a battery pack. The battery pack box includes a base plate and a frame, the base plate being connected with the frame; where the base plate includes: a first plate; a second plate, disposed opposite to the first plate; and a perforated plate, provided with a plurality of holes spaced; where the perforated plate is located between the first plate and the second plate, and is welded and fixed to the first plate and the second plate respectively. In the present application, the perforated plate can reduce the overall weight of the box and increase the energy density of the battery pack.

18 Claims, 6 Drawing Sheets

(51) Int. Cl.
   *H01M 10/625*   (2014.01)
   *H01M 50/204*   (2021.01)
   *H01M 50/24*    (2021.01)
   *H01M 50/249*   (2021.01)

(52) U.S. Cl.
   CPC ......... *H01M 50/204* (2021.01); *H01M 50/24* (2021.01); *H01M 50/249* (2021.01); *H01M 2220/20* (2013.01)

(56) References Cited

FOREIGN PATENT DOCUMENTS

| | | | | |
|---|---|---|---|---|
| CN | 109192890 A | * | 1/2019 | .......... H01M 10/613 |
| CN | 109216601 A | | 1/2019 | |
| CN | 109216616 A | * | 1/2019 | |
| JP | H02109800 A | | 4/1990 | |
| WO | WO-2019001357 A1 | * | 1/2019 | ............... B60K 1/04 |

OTHER PUBLICATIONS

Machine English Translation for CN 109192890 A (Year: 2018).*
Machine English Translation for CN 10926616 A (Year: 2019).*
Machine English Translation for CN 206849897 U (Year: 2017).*
Machine English Translation for WO 2019001357 A1 (Year: 2019).*
English Machine Translation for CN-107579181-A (Year: 2018).*
English Machine Translation for CN-206849897-U (Year: 2018).*
English Machine Translation for WO-2019001357-A1 (Year: 2019).*
International Search Report dated Nov. 4, 2019 issued in PCT/CN2019/075364, 4 pages.

* cited by examiner

BATTERY PACK BOX AND BATTERY PACK

CROSS-REFERENCE TO RELATED APPLICATIONS

The present application is a continuation of International Application No. PCT/CN2019/075364, filed on Feb. 18, 2019, which claims priority to Chinese Patent Application No. 201920171822.4, filed to the Chinese Patent Office on Jan. 30, 2019 and entitled "BATTERY PACK BOX AND BATTERY PACK", the entire content of which is incorporated herein by reference.

TECHNICAL FIELD

The present application relates to the field of battery technologies, and in particular, to a battery pack box and a battery pack.

BACKGROUND

With the gradual improvement of electric vehicle technology and power battery technology, requirements to an energy density of a battery pack become increasingly higher. The overall energy density of an existing battery pack is increased by reducing the weight of the box and changing the structure of the box.

The box of existing battery pack includes a base plate on which electrical components such as battery cells are mounted. Generally, the existing base plate is a sheet metal member, which is made of metal and integrally stamped and molded. However, in order to reduce the weight of the box, the inner surface of the base plate is provided with a number of concave parts, and the structure of the base plate is complicated, resulting in the box uneasy to manufactured and molded and unable to meet the requirements of group efficiency.

In addition, the base plate has limited support in its height direction, and the base plate does not provide sufficient support for other components such as cells. And the load-bearing capacity of the base plate is limited and it is difficult for the base plate to withstand the impact of other components such as battery cells.

SUMMARY

In view of this, an embodiment of the present application is provided with a battery pack box and a battery pack, which is favorable to reduce the overall weight of the box and increase the energy density of the battery pack.

In a first aspect, a battery pack box is provided, including a base plate and a frame, and the base plate being connected with the frame;
where the base plate includes:
a first plate;
a second plate, disposed opposite and spaced to the first plate; and
a perforated plate, provided with a plurality of holes spaced;
where the perforated plate is located between the first plate and the second plate, and is welded and fixed to the first plate and the second plate respectively.

Optionally, each of the plurality of holes is disposed along a height direction of the perforated plate;
and each of the plurality of holes includes a hollow through hole passing through the perforated plate.

Optionally, a cross section of each of the plurality of holes includes a geometric figure; and/ or,
a cross section of each of the plurality of holes includes a combination of one or more of a triangle, a trapezoid, a rhombus, a pentagon, a hexagon, a circle and a bow-shape.

Optionally, the perforated plate includes a honeycomb plate.

Optionally, the perforated hole is molded by a plurality of connection parts connected with each other.

Optionally, the perforated hole is brazed and fixed to the first plate and the second plate respectively.

Optionally, materials of the first plate, the second plate and the perforated plate are the same.

Optionally, a material of the perforated plate includes aluminum alloy.

Optionally, the base plate includes a reinforcing crossbeam, and a height of the reinforcing crossbeam is the same as a height of the perforated plate;
the reinforcing crossbeam is located between the first plate and the second plate, and connecting the first plate and the second plate to each other.

Optionally, the perforated plate is disposed with avoidance of the reinforcing crossbeam.

Optionally, the base plate includes a plurality of reinforcing crossbeams, the plurality of the reinforcing crossbeams are disposed at intervals.

Optionally, the base plate includes a plurality of reinforcing crossbeams, the plurality of the reinforcing crossbeams are arranged in a grid shape.

Optionally, a shape of the reinforcing crossbeam includes a combination of one or more of an S shape, a ring shape, a strip shape, a cross shape.

Optionally, the reinforcing crossbeam includes a cooling plate, and the cooling plate is provided with a cooling channel for a cooling medium to flow through.

Optionally, the reinforcing crossbeam is provided with an accommodating chamber;
a surface of the reinforcing crossbeam protrudes and is provided with a boss;
a first hole and a second hole are provided on the boss, with the first hole and the second hole passing through the boss respectively;
the first hole and the second hole are in communication with the accommodating chamber respectively;
the second plate is provided with an avoidance through hole;
and the boss is configured to extend into the avoidance through hole.

Optionally, the reinforcing crossbeam includes a heating plate, and the heating plate is configured to heat the base plate when being energized.

A surface of the reinforcing crossbeam protrudes and is provided with a boss;
the second plate is provided with an avoidance through hole;
the boss is configured to extend into the avoidance through hole;
and the boss is provided with a positive electrode and a negative electrode respectively.

Optionally, the frame is disposed around the base plate;
the frame is provided with an extension part; and the extension part is configured to extend into a space between the first plate and the second plate, and is configured to fixedly connect to the base plate.

In a second aspect, a battery pack is provided, including:
a battery pack box, including a base plate and a frame, the
base plate being connected with the frame;
where the base plate includes:
a first plate;
a second plate, disposed opposite and spaced to the first plate;
a perforated plate, provided with a plurality of holes spaced;
where the perforated plate is located between the first plate and the second plate, and is welded and fixed to the first plate and the second plate respectively; and
a battery cell, the battery cell being fixedly connected to the battery pack box.

Another aspect of the present application provides an apparatus including the battery pack according to any of the above embodiments, where the battery pack is adapted to provide power for the apparatus.

In the battery pack box and the battery pack provided by embodiments of the present application, the perforated plate is located between the first plate and the second plate, and the first plate and the second plate that are arranged opposite and spaced are connected. The perforated plate is provided with a plurality of holes. The perforated plate may reduce the overall weight of the box and increase the energy density of the battery pack.

A plurality of holes on the perforated plate are disposed at intervals. The perforated plate is provided with a plurality of supporting beam structures that are connected with each other to enclose and form the plurality of holes, the plurality of supporting beam structures may distribute a pressure from the first plate and/or the second plate, so that the base plate is under a uniform force, having strong pressure resistance and good seismic performance, and is configured to improve the structural rigidity and support strength of the base plate and the box, the base plate and the box are uneasy to deform, which improve the load-bearing performance and impact resistance performance of the base plate and the box.

The perforated plate and the reinforcing crossbeam are provided between the first plate and the second plate at the same time, which further are improve the structural rigidity and support strength of the base plate and the box.

The reinforcing crossbeam is configured to be provided as a cooling plate and/or heating plate, without the need to additionally set a cooling plate and/or a heating plate inside the box, where the structure is streamlined and the available space inside the box is increased and the energy density of the battery pack is improved.

It should be understood that the foregoing general descriptions and the following detailed descriptions are merely examples, and do not constitute any limitation on the present application.

BRIEF DESCRIPTION OF DRAWINGS

To describe the technical solutions in the embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

REFERENCE SIGNS

1-Battery pack box;
   10-Frame;
      100-Main body part of the frame;
      102-Extension part;
   20-Base plate;
   30-First plate;
   40-Perforated plate;
      400-Connection part;
      402-hole;
   50-Reinforcing crossbeam;
      500-Boss;
      502-First hole;
      504-Second hole;
   60-Second plate; and
      602-Avoidance through hole.

DESCRIPTION OF EMBODIMENTS

To better understand the technical solutions in the present application, the following describes embodiments of the present application with reference to the accompanying drawings.

It should be understood that the described embodiments are merely some but not all of the embodiments of the present application. All other embodiments obtained by a person of ordinary skill in the art based on the embodiments in the present application without creative efforts shall fall within the protection scope of the present application.

The terms used in the embodiments of the present application is for the purpose of describing specific embodiments and is not intended to limit the present application. The singular forms "one", "said" and "the" used in the embodiments of the present application and the appended claims are also intended to include plural forms unless the context clearly indicates other meanings.

It should be understood that the term "and/or" in this specification describes only an association relationship for describing associated objects and represents that three relationships may exist. For example, A and/or B may represent the following three boxes: Only A exists, both A and B exist, and only B exists. In addition, the character "/" in this text generally indicates that the associated objects before and after the character are in an "or" relationship.

It should be understood that, unless otherwise stated, "a plurality of" means two or more (including two), the terms "first", "second" and "third" are only intended for a purpose of description, and shall not be understood as an indication or implication of relative importance and assembling sequence.

Unless explicitly specified and defined otherwise, terms "installation", "interconnection", and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the description of this specification, it should be understood that the terms "substantially", "approximately", "approximately", "about", "approximately" and "substantially" described in the claims and embodiments of the present application refer to within a reasonable process operation range or tolerance range, which can be generally agreed, rather than an exact value.

Figure 1:
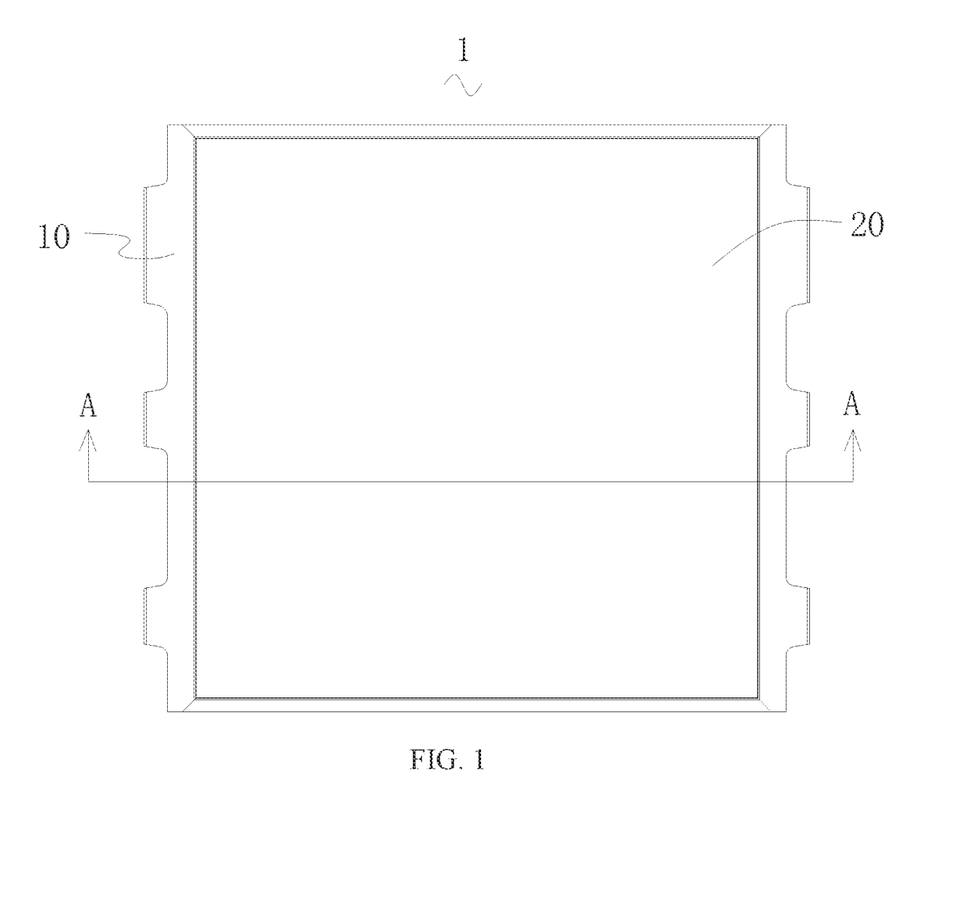
FIG. 1 is a structural schematic diagram of a battery box provided by an embodiment of the present application.
Figure 2:
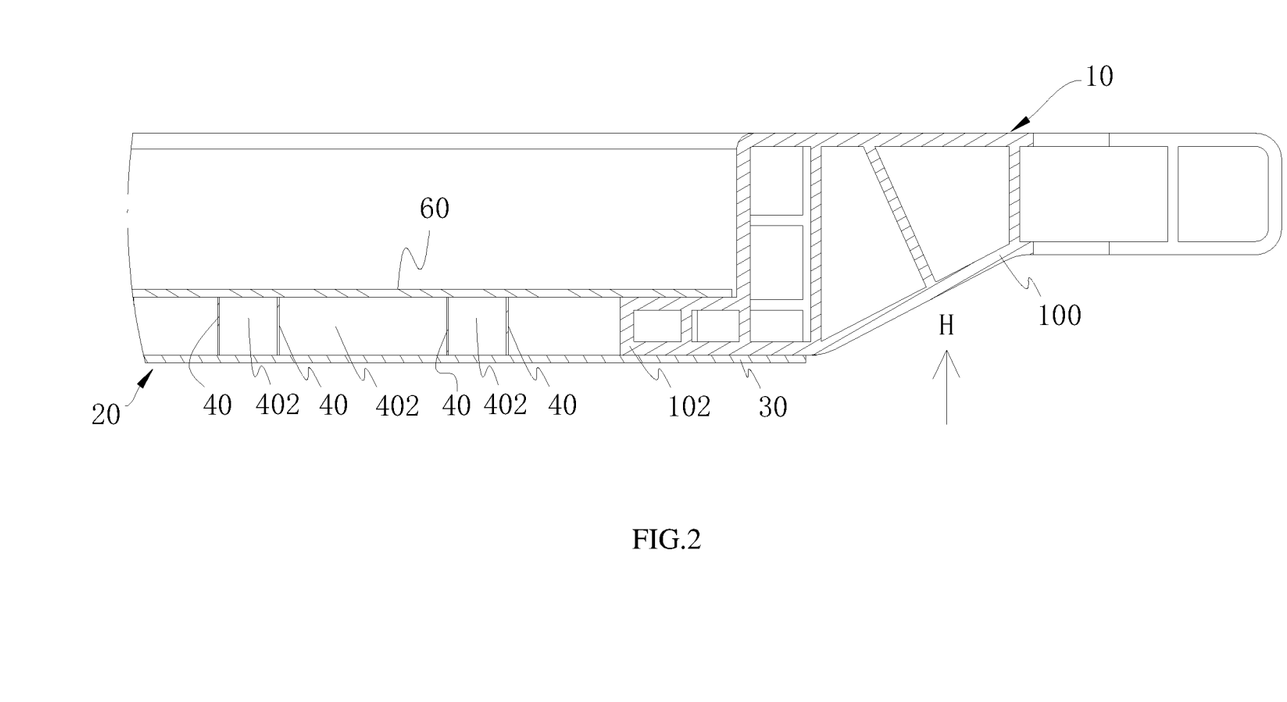
FIG. 2 is a partial cross-sectional view taken along A-A of FIG. 1.

An embodiment according to the present application, is provided with a battery pack. With reference to FIG. 1 to FIG. 2, the battery pack includes a battery cell and a battery pack box 1. The battery cell is fixed and connected to the battery pack box 1. For example, the battery pack box 1 is configured to be connected and fixed to components such as a box cover, to protect the battery cells.

The battery pack box 1 includes a base plate 20 and a frame 10. The base plate 20 is connected with the frame 10. The base plate 20 includes a first plate 30, a second plate 60 and a perforated plate 40.

The first plate 30 is disposed opposite and spaced to the second plate 60. The perforated plate 40 is disposed in a space between the first plate 30 and the second plate 60. The battery pack box 1 has a height direction H, and the plurality of perforated plates 40 extend along the height direction H to a set height. A plurality of holes 402 are provided on the perforated plate 40, and the plurality of holes 402 are arranged along the height direction of the perforated plate 40. On a plane of the perforated plate 40 perpendicular to its height direction H, a plurality of holes 402 on the perforated plate 40 are distributed at intervals.

Two ends of the perforated plate 40 in the height direction H are welded and fixed to the first plate 30 and the second plate 60 respectively, thus the first plate 30 and the second plate 60 are connected to each other.

Due to the plurality of holes 402 provided on the perforated plate 40, the weight of the perforated plate 40 is relatively small, thereby reducing the overall weight of the battery pack box 1 and increasing the energy density of the battery pack.

Since a plurality of holes 402 on the perforated plate 40 are disposed at intervals. The perforated plate 40 is provided with a plurality of supporting beam structures that are connected with each other to enclose and form the plurality of holes 402. The plurality of supporting beam structures may distribute a pressure from the first plate 30 and/or the second plate 60, so that the base plate 20 is under a uniform force, having strong pressure resistance and good seismic performance, which is configured to improve the structural rigidity and support strength of the base plate 20 and the battery pack box 1, the base plate 20 and the battery pack box 1 are uneasy to deform in the height direction H, which improve the load-bearing performance and impact resistance performance of the base plate 20 and the battery pack box 1.

The first plate 30, the second plate 60 and the perforated plate 40 can be manufactured and molded respectively. The first plate 30 and the second plate 60 are connected to each other by the perforated plate 40 to form the base plate 20, of which the structure is simple, and is easy to manufacture and convenient to assemble.

In order to more fully explain the structure of the perforated plate in the embodiments of the present application, the battery pack box 1 will be further described below.

A cross section of the hole 402 on the perforated plate 40 can be selected and set as required, and the cross section of the hole 402 on the perforated plate 40 can be set regularly or irregularly. In an optional example, the cross section of the hole 402 on the perforated plate 40 may include a geometric figure, which is a plane geometric figure. It can be understood that the cross section of the hole 402 on the perforated plate 40 is a cross section along a plane perpendicular to the height direction H.

Figure 3:
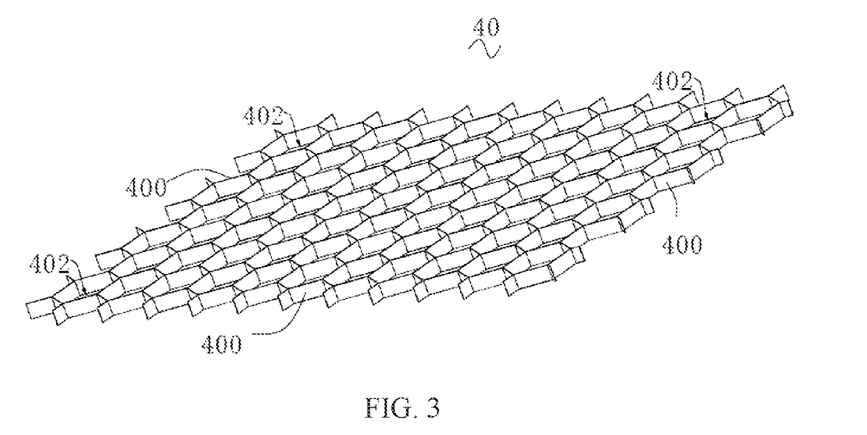
FIG. 3 is a structural schematic diagram of a perforated plate in a battery pack box of FIG. 1.

In an optional example, the cross section of the hole 402 on the perforated plate 40 includes a combination of one or more of a triangle, a trapezoid, a rhombus, a pentagon, a hexagon, a circle and a bow-shape. For example, as shown in FIG. 3, the cross section of the hole 402 is a hexagon.

The extension height of the hole 402 can be selected and set as required. In an optional example, with continuous reference to FIG. 3, the hole 402 includes a hollow through hole passing through the perforated plate 40. The setting with the holes 402 passing through the perforated plate 40, can further reduce the weight of the perforated plate 40, thereby reducing the overall weight of the battery pack box 1 and increasing the energy density of the battery pack.

The way of molding of the perforated plate 40 can be selected and set as required. In an optional example, with continuous reference to FIG. 3, the perforated plate 40 may be molded by a plurality of connection parts 400 connected with each other. The plurality of connection parts 400 collectively enclose to form a plurality of holes 402 that are spaced apart. For example, the perforated plate 40 may be molded integrally and form a plurality of connection parts 400 connected to each other after being molded integrally. For another example, after the plurality of connection parts 400 are manufactured and molded respectively, they are connected with each other to form the perforated plate 40.

The specific arrangement of the holes 402 on the perforated plate 40 can be selected and set as required. According to the shape of the cross section of the holes 402 on the perforated plate 40, the arrangement of the holes 402 on the perforated plate 40 can be set accordingly.

In an optional example, with continuous reference to FIG. 3, the perforated plate 40 includes a honeycomb plate. The cross section of the hole 402 on the honeycomb plate can be set to or be approximate a hexagon. All six sides of the hexagonal hole 402 can be connected to one side of the other hexagonal hole 402 through the connection part 400. For example, the connection part 400 may use a sheet material.

The hexagonal honeycomb plate has a number of staggered connection parts 400 to form a densely distributed grid shape, allowing the perforated plate 40 to obtain a support beam structure extending along the height direction H, so that it is under uniform force, has strong pressure resistance and good seismic performance. The honeycomb plate is easy to be manufactured and molded, and is easy to be manufactured and implemented in process.

For containers with a same capacity, the hexagonal honeycomb plate requires less materials, which can reduce the weight of the perforated plate 40, thereby reducing the overall weight of the battery pack box 1 and increasing the energy density of the battery pack.

With the staggered connection parts 400, the supporting performance can be guaranteed. The thickness of the connection part 400 can be set to be thinner, using less materials, which can reduce the weight of the perforated plate 40, thereby reducing the overall weight of the battery pack box 1 and increasing the energy density of the battery pack.

In order to more fully describe the material of the battery pack box 1 and the connection structure of each component in the embodiments of the present application, the battery pack box 1 will be further described below.

The material of the perforated plate 40 can be selected and set as required.

In an optional example, the material of the perforated plate 40 includes aluminum alloy. Aluminum alloy has high rigidity, light weight, high cost performance, low cost, corrosion resistance and durability. For example, the entire battery pack box 1 can be made of aluminum alloy.

In an optional example, the materials of the first plate 30, the second plate 60 and the perforated plate 40 can be set to the same material, which facilitates the welding and fixing between the perforated plate 40 and the first plate 30 and the second plate 60, respectively.

In an optional example, two ends of the perforated hole 40 along the height direction may be brazed and fixed to the first plate 30 and the second plate 60 respectively. The brazing and fixing is configured to weld a same material or different materials, with small deformation and accurate dimension accuracy of workpiece. Further, the battery pack box 1 is configured to be brazed and fixed as an integral piece.

In an optional example, with continuous reference to FIG. 1 and FIG. 2, the frame 10 may be arranged around the base plate 20. The frame 10 includes a frame main body part 100 and an extension part 102 provided on the main body part 100. The extension part 102 extends into a space between the first plate 30 and the second plate 60. The frame 10 is fixedly connected to the base plate 20. For example, the extension part 102 of the frame 10 and the base plate 20 can be welded and fixed.

The embodiments of the present application may adopt one or more combinations of the foregoing plurality of examples.

Figure 4:
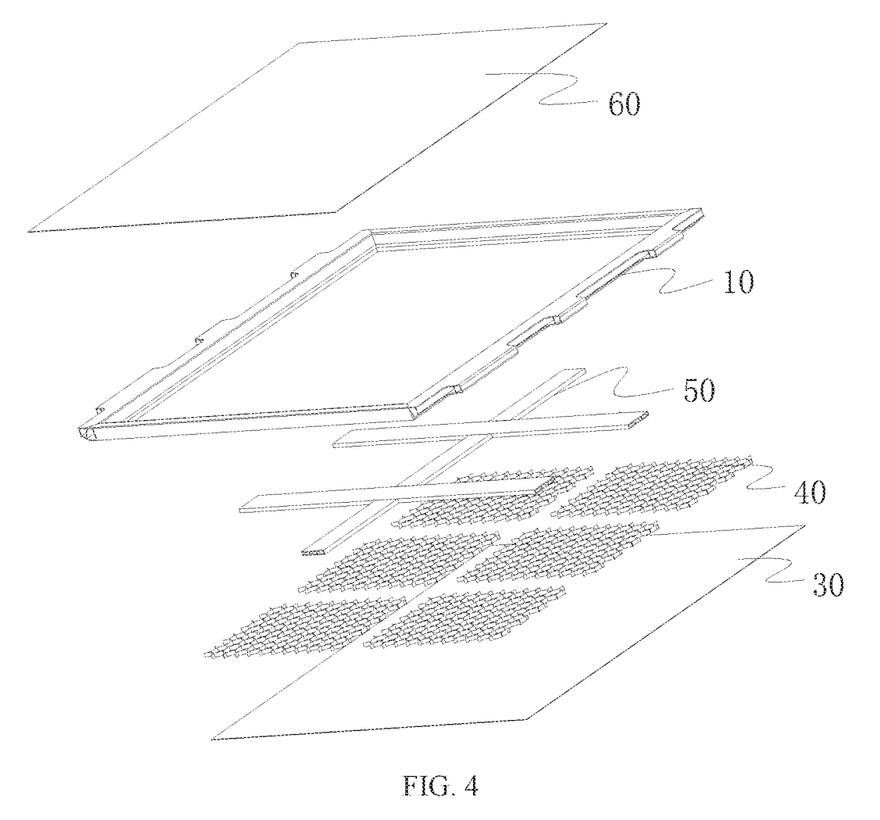
FIG. 4 is an exploded view of components of the battery pack box of FIG. 1.
Figure 5:
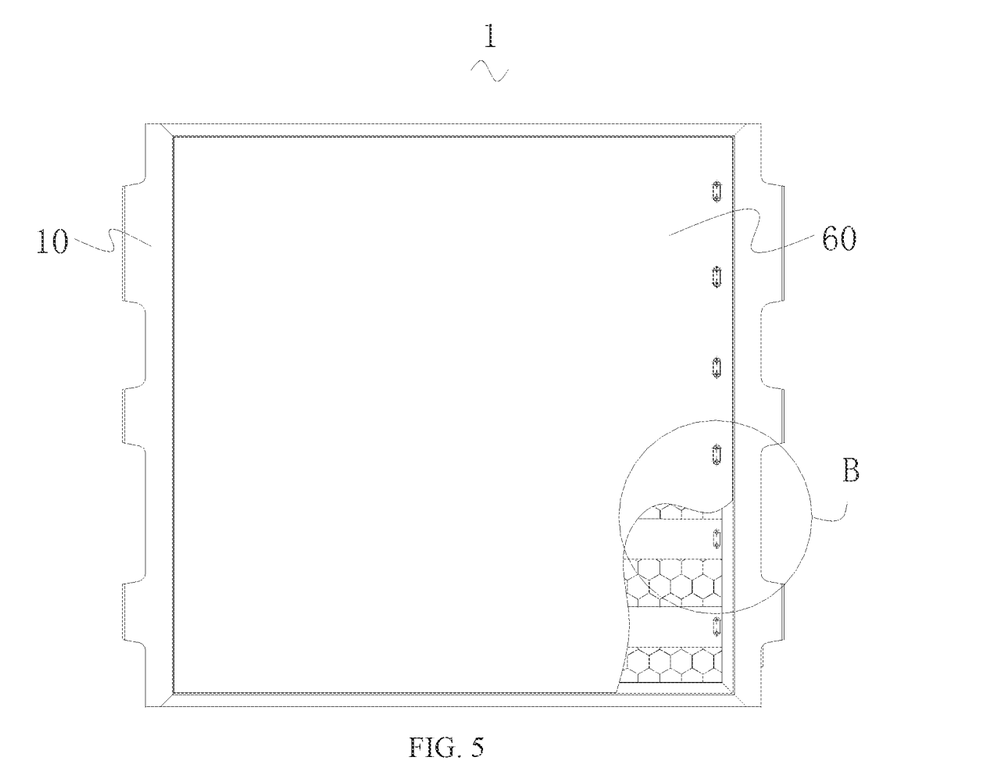
FIG. 5 is a schematic structural diagram of a battery pack box provided by an embodiment of the present application.

In order to further improve the supporting and load-bearing capacity of the base plate 20, in an optional example, with reference to FIG. 4 or FIG. 5, the base plate 20 includes a reinforcing crossbeam 50. The reinforcing crossbeam 50 is located between the first plate 30 and the second plate 60, and the height of the reinforcing crossbeam 50 is equal to the height of the perforated plate 40. The reinforcing crossbeam 50 is connected with the first plate 30 and the second plate 60. The perforated plate 40 is disposed with avoidance of the reinforcing crossbeam 50. The reinforcing crossbeam 50 can increase the overall rigidity and supporting strength of the battery pack box 1.

Under the joint action of the reinforcing crossbeam 50 and the perforated plate 40, the overall rigidity and supporting strength of the battery pack box 1 can be further increased. For example, the reinforcing crossbeam 50 and the perforated plate 40 may fill the space between the first plate 30 and the second plate 60.

The arrangement manner of the reinforcing crossbeam 50 between the first plate 30 and the second plate 60 can be set as required, and the perforated plate 40 is configured to be arranged to avoid the arrangement manner of the reinforcing crossbeam 50.

In an optional example, with reference to FIG. 4, the plurality of reinforcing crossbeams 50 may be arranged to a grid shape. The plurality of perforated plates 40 can be filled in the grid space at intervals.

Figure 6:
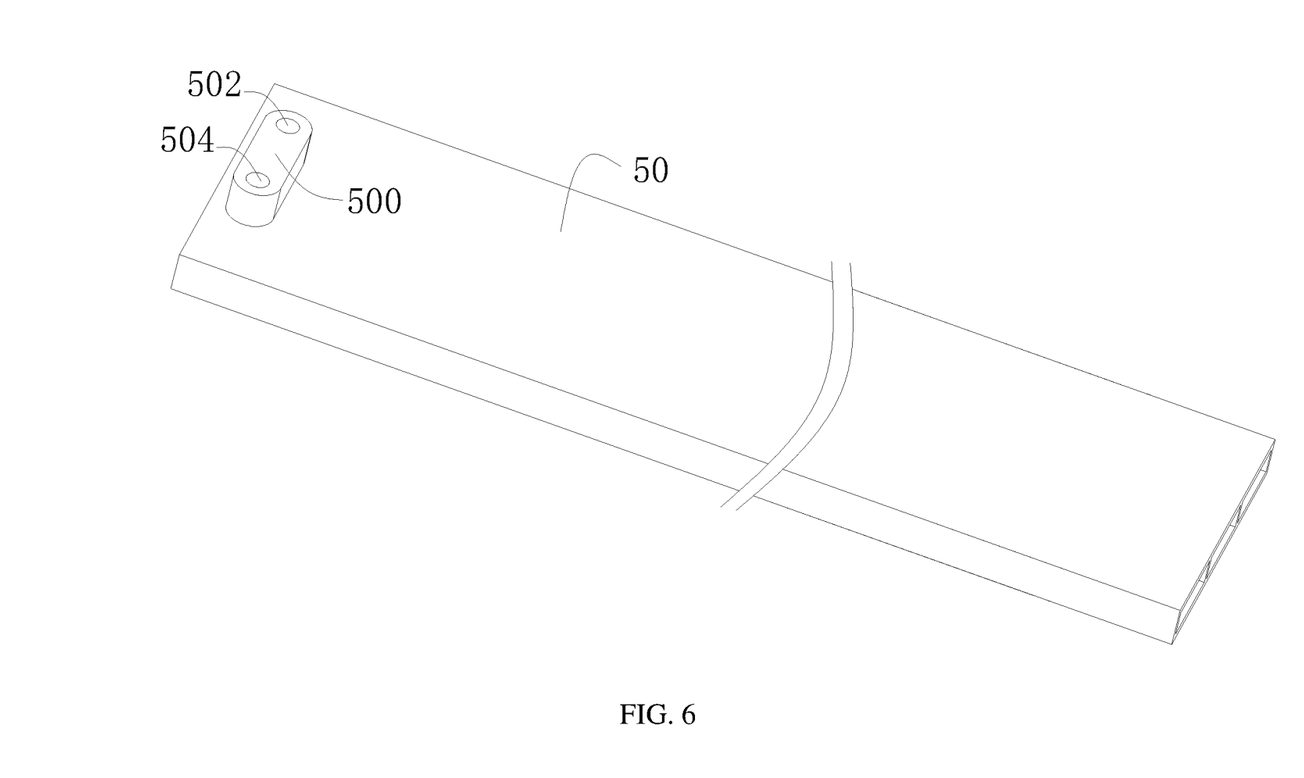
FIG. 6 is a schematic structural diagram of a reinforcing crossbeam in the battery pack box of FIG. 5.
Figure 7:
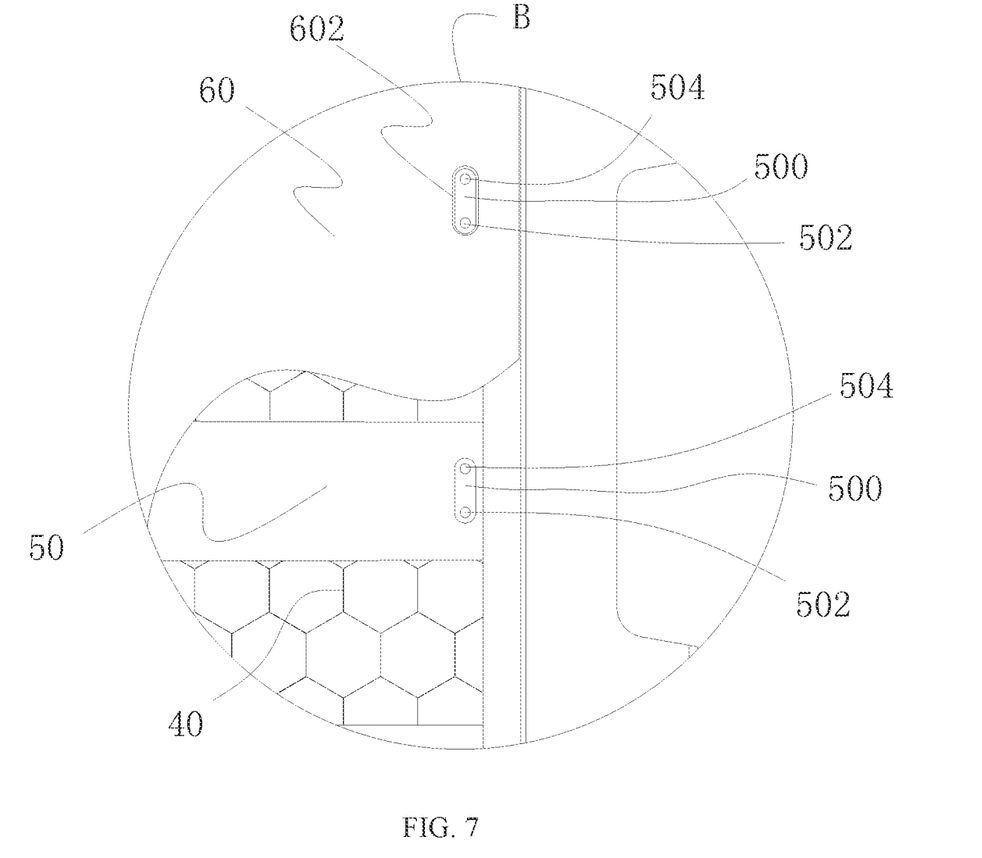
FIG. 7 is an enlarged schematic diagram of a position B in FIG. 5.

In an optional example, with reference to FIGS. 5 to 7, the base plate 20 may include a plurality of reinforcing crossbeams 50. The plurality of the reinforcing crossbeams 50 are disposed at intervals. A number of perforated plates 40 is configured to be filled in the space between two adjacent reinforcing crossbeams 50 at intervals.

In an optional example, a shape of the reinforcing crossbeam 50 includes a combination of one or more of an S shape, a ring shape, a strip shape, a cross shape, a string-like shape, an upside down double-T shape, a waffle shape, a utility-pole shape and a window shape. In an example, as shown in FIG. 4, the shape of the reinforcing crossbeam 50 is a string-like shape. In another example, as shown in FIG. 6, the shape of the reinforcing crossbeam 50 is a strip shape.

In order to make full use of the space, the reinforcing crossbeam 50 may be integrated with other structures.

In an optional example, with reference to FIGS. 5 to 7, the reinforcing crossbeam 50 may include a cooling plate. The cooling plate is provided with a cooling channel for a cooling medium to flow through.

The reinforcing crossbeam 50 is provided with an accommodating chamber. A surface of the reinforcing crossbeam 50 protrudes and is provided with a boss 500. A first hole 502 and a second hole 504 are provided on the boss 500, with the first hole 502 and the second hole 504 passing through the boss 500 respectively. The first hole 502 and the second hole 504 are in communication with the accommodating chamber respectively. The second plate 60 is provided with an avoidance through hole 602. The boss 500 extends into the avoidance through hole 602. The first hole 502 is configured to allow the cooling medium to flow into the reinforcing crossbeam 50. The cooling medium flowing into the reinforcing crossbeam 50 from the first hole 502 is configured to flow out of the reinforcing crossbeam 50 from the second hole 504. In this way, the cooling channel provided in the reinforcing crossbeam 50 is configured to be connected to a circulating channel, so that the cooling medium is configured to circulate to realize the cooling function.

In an optional example, with reference to FIGS. 5 to 7, the reinforcing crossbeam 50 may include a heating plate. The heating plate is configured to be heated to generate heat when it is energized. The reinforcing crossbeam 50 is provided with a heating component. For example, the heating plate may adopt a PTC (Positive Temperature Coefficient, thermistor) heater.

A surface of the reinforcing crossbeam 50 protrudes and is provided with a boss 500. The second plate 60 is provided with an avoidance through hole 602. The boss 500 extends into the avoidance through hole 602. The boss 500 is provided with a positive electrode 502 and a negative electrode 504 respectively. The positive electrode 502 and the negative electrode 504 are connected to a circuit to implement the heating function of the heating plate to the base plate 20.

The embodiments of the present application may adopt one or more combinations of the foregoing plurality of examples. In this way, the reinforcing crossbeam 50 may be provided with a cooling plate and/or a heating plate, and there is no need to additionally provide a cooling plate and/or a heating plate in the battery pack box 1, thereby simplifying the structure, increasing the available space in the battery pack box 1 and improving the energy density of the battery pack. In addition, the cooling plate and/or the heating plate are arranged between the first plate 30 and the second plate 60, and around which the perforated plate 40 is arranged. The protective effect of the first plate 30, the second plate 60 and the perforated plate 40 can prevent cooling plate and/or heating plate from damage by the impact of external force.

The embodiments of the present disclosure further provide an apparatus, which includes a battery pack according to any of the embodiments as described above, where the battery pack is adapted to provide power for the apparatus.

The apparatus may be an electric vehicle, a hybrid vehicle, an electric scooter, an electric cart or any other suitable devices which can include the battery pack as their own power source.

The foregoing descriptions are merely example embodiments of the present application, but are not intended to limit the present application. Any modification, equivalent replacement, or improvement made without departing from the spirit and principle of the present application shall fall within the protection scope of the present application.

What is claimed is:

1. A battery pack box, comprising a base plate and a frame, the base plate being connected with the frame;
wherein the base plate comprises:
a first plate;
a second plate, disposed opposite and spaced to the first plate; and
a perforated plate, provided with a plurality of holes spaced;
wherein the perforated plate is located between the first plate and the second plate, and is welded and fixed to the first plate and the second plate respectively;
wherein the base plate comprises a reinforcing crossbeam, the reinforcing crossbeam is located between the first plate and the second plate, and connecting the first plate and the second plate to each other;
wherein the reinforcing crossbeam comprises a heating plate, the heating plate is configured to heat the base plate when being energized, a surface of the reinforcing crossbeam protrudes and is provided with a boss, the second plate is provided with an avoidance through hole, the boss is configured to extend into the avoidance through hole, the boss is provided with a positive electrode and a negative electrode respectively, and the positive electrode and the negative electrode are connected to a circuit to implement the heating function of the heating plate to the base plate.

2. The battery pack box according to claim 1, wherein each of the plurality of holes is disposed along a height direction of the perforated plate; and each of the plurality of holes comprises a hollow through hole passing through the perforated plate.

3. The battery pack box according to claim 1, wherein a cross section of each of the plurality of holes comprises a geometric figure.

4. The battery pack box according to claim 1, wherein the perforated plate comprises a honeycomb plate.

5. The battery pack box according to claim 1, wherein the perforated hole is molded by a plurality of connection parts connected with each other.

6. The battery pack box according to claim 1, wherein the perforated hole is brazed and fixed to the first plate and the second plate respectively.

7. The battery pack box according to claim 1, wherein materials of the first plate, the second plate and the perforated plate are the same.

8. The battery pack box according to claim 1, wherein a material of the perforated plate comprises aluminum alloy.

9. The battery pack box according to claim 1, wherein a height of the reinforcing crossbeam is the same as a height of the perforated plate, and the perforated plate is disposed with avoidance of the reinforcing crossbeam.

10. The battery pack box according to claim 1, wherein the base plate comprises a plurality of reinforcing crossbeams, the plurality of reinforcing crossbeams are disposed at intervals.

11. The battery pack box according to claim 1, wherein the base plate comprises a plurality of reinforcing crossbeams, the plurality of reinforcing crossbeams are arranged in a grid shape.

12. The battery pack box according to claim 1, wherein a shape of the reinforcing crossbeam comprises a combination of one or more of an S shape, a ring shape, a strip shape, a cross shape.

13. The battery pack box according to claim 1, wherein the reinforcing crossbeam comprises a cooling plate, and the cooling plate is provided with a cooling channel for a cooling medium to flow through.

14. The battery pack box according to claim 1, wherein the reinforcing crossbeam is provided with an accommodating chamber;
a first hole and a second hole are provided on the boss, with the first hole and the second hole passing through the boss respectively;
the first hole and the second hole are in communication with the accommodating chamber respectively.

15. The battery pack box according to claim 1, wherein the frame is disposed around the base plate;
the frame is provided with an extension part; and the extension part is configured to extend into a space between the first plate and the second plate, and is configured to fixedly connect to the base plate.

16. A battery pack, comprising:
a battery pack box, comprising a base plate and a frame, the base plate being connected with the frame;
wherein the base plate comprises:
a first plate;
a second plate, disposed opposite and spaced to the first plate;
a perforated plate, provided with a plurality of holes spaced;
wherein the perforated plate is located between the first plate and the second plate, and is welded and fixed to the first plate and the second plate respectively; and
a battery cell, the battery cell being fixedly connected to the battery pack box;
wherein the base plate comprises a reinforcing crossbeam, the reinforcing crossbeam is located between the first plate and the second plate, and connecting the first plate and the second plate to each other;
wherein the reinforcing crossbeam comprises a heating plate, the heating plate is configured to heat the base plate when being energized, a surface of the reinforcing crossbeam protrudes and is provided with a boss, the second plate is provided with an avoidance through hole, the boss is configured to extend into the avoidance through hole, the boss is provided with a positive electrode and a negative electrode respectively, and the positive electrode and the negative electrode are connected to a circuit to implement the heating function of the heating plate to the base plate.

17. An apparatus, comprising the battery pack according to claim 16, wherein the battery pack is adapted to provide power for the apparatus.

18. The battery pack box according to claim 3, wherein a cross section of each of the plurality of holes comprises a combination of one or more of a triangle, a trapezoid, a rhombus, a pentagon, a hexagon, a circle and a bow-shape.

* * * * *